United States Patent [19]

Fage et al.

[11] Patent Number: 5,745,435
[45] Date of Patent: Apr. 28, 1998

[54] METHOD OF TESTING AN ACOUSTIC ARRAY ANTENNA

[75] Inventors: Jean-Michel Fage, Paris; Rémy Tasso, Chateaufort, both of France

[73] Assignee: Remtech, Velizy, France

[21] Appl. No.: 797,033

[22] Filed: Feb. 10, 1997

[30] Foreign Application Priority Data

Feb. 12, 1996 [FR] France ................... 96 01676

[51] Int. Cl.$^6$ .................................................. H04B 17/00
[52] U.S. Cl. ............................................................. 367/13
[58] Field of Search ............................ 367/13; 73/1.82

[56] References Cited

U.S. PATENT DOCUMENTS

| | | | |
|---|---|---|---|
| 3,859,620 | 1/1975 | Percy | 367/13 |
| 4,205,394 | 5/1980 | Pickens | 367/13 |
| 5,089,988 | 2/1992 | Arens | 367/13 |
| 5,521,883 | 5/1996 | Fage et al. | 367/90 |

FOREIGN PATENT DOCUMENTS

| | | |
|---|---|---|
| 0433652 | 11/1990 | European Pat. Off. . |
| 2256273 | 2/1992 | United Kingdom . |

OTHER PUBLICATIONS

Holland, J.P., "A Large Shipboard Passive Sonar Array Calibration Technique", Ocean Technologies and Opportunities in the Pacific for the 90's, Honolulu, Oct. 1–3, 1991, vol. 3.

*Primary Examiner*—Daniel T. Pihulic
*Attorney, Agent, or Firm*—Lappin & Kusmer LLP

[57] ABSTRACT

A method of testing an acoustic array antenna, consisting in using at least one independent acoustic transducer of non-directional type for receiving the same signal simultaneously via the transducer and via the antenna, and in comparing the received signals to identify possible fixed echoes and to verify whether or not the antenna and its associated cabling, relay, amplification, and signal generating and processing means are in a nominal operating state.

8 Claims, 1 Drawing Sheet

METHOD OF TESTING AN ACOUSTIC ARRAY ANTENNA

The invention relates to a method of testing an acoustic array antenna, in particular an antenna that is suitable for remotely measuring the three-dimensional speed of a fluid such as air or water, in particular atmospheric air, at various altitude ranges.

BACKGROUND OF THE INVENTION

Antennas of this type have already been disclosed, e.g. in patent application EP-0 640 845 in the name of the Applicant corresponding to U.S. Pat. No. 5,521,883, incorporated by reference herein. They essentially comprise an array of acoustic transducers organized in rows and columns, facing in a common direction, and driven by signal generating and processing means, the transducers acting both as emitters and as receivers.

To determine the speed of the fluid, signals are emitted at given frequencies in various directions, the signals backscattered by the fluid are picked up, their frequencies are measured, and the speed of the fluid in one direction is calculated on the basis of the frequency shift between the signals as emitted and the signals as received in said direction.

The very low level of the signals backscattered by the fluid makes such measurement very difficult. Measurement can be performed properly only if the antenna and the associated cabling, relay, amplification, and processing means are in a known "nominal" operating state. Nevertheless, it is difficult, or even impossible at antenna installation sites, to verify said operating state, in particular because of the way the transducers are cabled in groups which means that from the point of view of signal generation and processing, an antenna comprising 52, 196 or 432 transducers, for example, appears to be constituted solely by a few emitter-receivers powered by two paths connected to an information processing system.

OBJECTS AND SUMMARY OF THE INVENTION

An object of the present invention is to provide a simple and effective solution to that problem.

To this end, the invention proposes a method of testing an acoustic array antenna comprising a plurality of acoustic transducers disposed side by side in a matrix or similar configuration and driven by means for generating and processing signals, the method consisting in using at least one acoustic transducer of non-directional type for receiving a given signal simultaneously via said transducer and via the antenna, and in comparing the received signals to identify possible fixed echoes in the signal received by the antenna, and for verifying whether or not the antenna and the associated circuits are in a nominal operating state.

The invention is based on the fact that an acoustic array antenna is highly directional and consequently receives signals propagating in directions other than that of the main lobe of its radiation pattern with a very high degree of attenuation. However, a non-directional transducer will pick up of all of the signals in much the same manner regardless of their propagation directions. By comparing signals picked up by the antenna with signals picked up by the non-directional transducer, it is possible to acquire information either on the type of signal that has been picked up, or else on the operating state of the antenna and the associated cabling, relay, amplification, and processing means, assuming, naturally, that the above-mentioned non-directional transducer is itself in a nominal operating state.

The method of the invention can thus consist in using the antenna to emit a signal train, in using the antenna and the non-directional transducer to receive reflected or backscattered signals corresponding to the emitted signals, and in comparing the signals received by the antenna and by said transducer to identify fixed echoes.

Advantageously, it is possible to use several (preferably three) non-directional transducers for receiving the above-mentioned signals, and to deduce from the received signals both the direction and the range of objects or obstacles that are returning fixed echoes.

It is important to identify fixed echoes insofar as they can mask a useful signal of smaller amplitude.

The method of the invention also consists in picking up ambient noise by means of the antenna and of said non-directional transducer, in comparing the signals that are picked up, and in deducing therefrom whether or not the antenna and the associated circuits are in a nominal operating state.

According to another characteristic of the invention, the method also consists in emitting a signal train firstly over one of the emission paths, and then over the other, in picking up the signal trains by means of said transducer, in comparing the picked-up signals, and in deducing therefrom whether or not each emission path is in a nominal operating state.

The above-mentioned non-directional transducer(s) used for such verification, may either be transducers of the antenna, or else transducers that are independent from those of the antenna.

BRIEF DESCRIPTION OF THE DRAWING

The invention will be better understood and other characteristics, details, and advantages thereof will appear more clearly on reading the following description, given by way of example and made with reference to the accompanying drawing, in which.

MORE DETAILED DESCRIPTION

Figure 1:
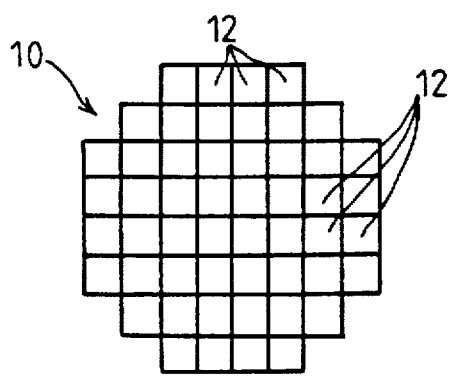
FIG. 1 is a diagram of an array of acoustic transducers constituting an antenna of the invention.

The array 10 of acoustic transducers 12 shown in FIG. 1 comprises 52 acoustic transducers disposed side by side in a matrix disposition of rows and columns and all pointing in the same direction (perpendicular to the plane of the drawing).

This transducer array constitutes an acoustic antenna which operates on principles described, for example, in the Applicant's above-mentioned European patent application number 0 640 845, corresponding to U.S. Pat. No. 5,521,883, the contents of which is incorporated herein by reference.

In an antenna of this type, the rows of transducers 12 are fed with signals of determined frequency and which are phase-shifted from one row of transducers to the next, thereby defining a first emission direction, after which the rows of transducers are fed with signals at the same frequency, but having different phase shifts from one row to the next, thereby defining a second emission direction, and so on, the emission direction being perpendicular to the plane of the array of transducers when all of the transducers are fed with signals having the same frequency and that are in phase.

On reception, the backscattered signals picked up by the transducers are combined with one another and processed to obtain sequentially or simultaneously as many reception signals as there are emission directions.

Figure 2:
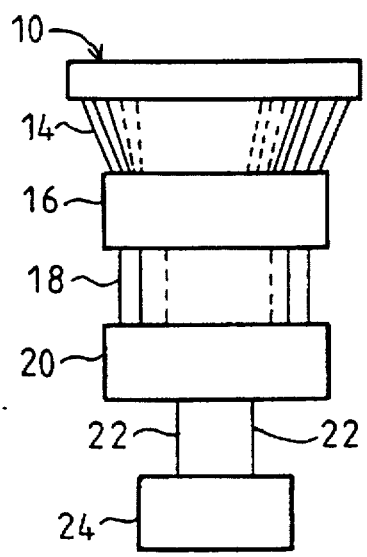
FIG. 2 is a diagram showing the circuits associated with the array of acoustic transducers.

FIG. 2 is a diagram of an embodiment of the means associated with the acoustic antenna 10 of FIG. 1, said means comprising cabling 14 connecting the groups of transducers 12 of the antenna to a set of relays 16, cabling 18 connecting the relays to amplifier and filter means 20, and two paths 22 connecting the amplifier and filter means to an information processing system 24, such as a microcomputer.

The cabling is of the tree type making it difficult to detect when an element or a group of elements is in a faulty state, without on-site testing of each element while the antenna is emitting.

That is why the invention proposes a method enabling an acoustic antenna of the type shown in FIGS. 1 and 2 to be tested automatically on reception and during emission.

To do this, advantage is taken of the fact that when an acoustic antenna 10 is in a "nominal" operating state, it is very highly directional, with its radiation pattern (FIG. 3) presenting a main lobe in the emission or reception direction, together with very small secondary lobes 28 at its base in directions pointing several tens of degrees away from the emission or reception direction, the main lobe 26 being much larger than the secondary lobes 28 such that ambient noise propagating generally in the plane of the antenna 10 is picked up thereby with a very large amount of attenuation compared with a signal picked up on the axis of the main lobe 26, said attenuation being about 50 dB, for example.

Figure 3:
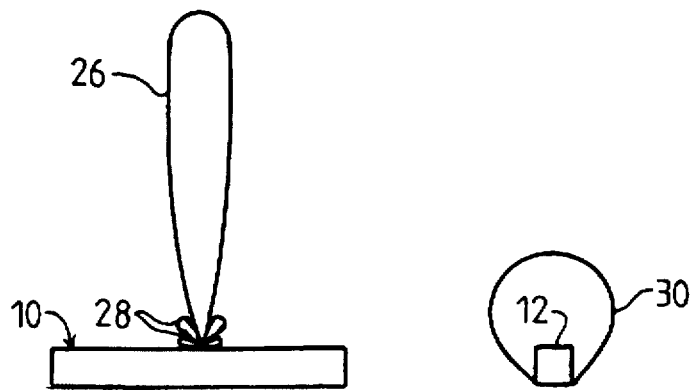
FIG. 3 is a diagram showing the radiation patterns of an acoustic antenna and of a non-directional transducer.

In contrast, an isolated acoustic transducer 12 (of the same type as the transducers of the antenna 10) is not directional and its radiation pattern 30 is almost spherical, as shown diagrammatically in FIG. 3.

Thus, when an acoustic antenna 10 of the above-specified type is used together with an isolated transducer 12 for picking up ambient noise at the site at which the antenna 10 is installed, the ratio of noise intensity picked up by the antenna 10 to the noise picked up by the isolated transducer 12 is normally below a certain threshold. If that is not the case, then the increase in noise level in the reception signal at the output from the antenna 10 can be due to various causes:

the antenna 10 may have picked up a noise that is not propagating substantially parallel to its own plane, but that has a larger component in the direction of the main lobe 26;

aging of the transducers 12 in the antenna 10 may have increased amplitude and/or phase dispersion between the various transducers;

the connections between transducers or between the transducers and the controlling electronic circuits may be faulty; and the electronic control circuits may be faulty.

The actions that need to be performed differ from one case to another. If the antenna 10 is picking up noise that is not propagating parallel to its own plane, it often suffices merely to move the antenna 10. In the other cases, the electronic equipment is replaced and the faulty equipment is returned to the factory where action can be taken on the cabling or on the electronic control circuits.

In any event, a very simple test suffices to determine whether the acoustic antenna 10 is in a nominal operating state for reception.

The invention also provides for checking the state of the antenna for emission and for detecting fixed echoes at the site of the installation.

With respect to the state of the antenna in emission, it is possible at more or less regular intervals to emit signals over only one of the two paths 22, and then over only the other one of the two paths.

The emitted signals are picked up by the isolated transducer 12 whose output signals are compared with one another. If the signals corresponding to the signals emitted on one of the two paths 22 have the same energy as those corresponding to signals emitted over the other path 22, said energy being compatible with the expected energy given nominal emission power via the acoustic antenna 10, it can be concluded that the antenna is in a nominal operating state for emission.

When the output signals from the isolated transducer 12 differ on changing emission path via the acoustic antenna 10, then the antenna is not in a nominal operating state for emission, and the faults may be due to numerous causes: poor generation of the emitted signal by the means 24; a defect of the amplification means 20 in one or other of the paths; poor state of the relays; a cabling fault.

The combination of the antenna and of the isolated transducer 12 also makes it possible to detect possible fixed echoes constituted by signals that are reflected directly (without frequency shifting) by obstacles situated at greater or lesser distances from the site where the acoustic antenna is installed and which are liable to mask the useful signal. Such fixed echoes are generally picked up by the secondary lobes 28 of the acoustic antenna 10, with a very high degree of attenuation compared with the signals picked up by the main lobe 26. Such fixed echoes may also be picked up by the isolated acoustic transducer 12 but with much smaller attenuation, the gain of the signals picked up by the isolated transducer being the same for fixed echoes and for signals backscattered by the fluid, so that it is possible to identify fixed echoes by comparing the signals received by the antenna 10 and by the isolated transducer 12.

By using three isolated transducers 12 distributed around the acoustic antenna 10, it is possible not only to detect fixed echoes, but also to determine the direction and the range of the obstacles that generate the fixed echoes.

Installing one or more isolated transducers 12 in the vicinity of the acoustic antenna 10 also makes it possible to process noise signals to eliminate them from signals picked up by the acoustic antenna 10, thereby increasing the signal-to-noise ratio of the antenna. The noise signals are picked up with differing amounts of attenuation by the antenna 10 and by the isolated transducer(s) 12, thus making it possible, given the phase and amplitude transfer function between the acoustic antenna and the isolated transducer(s) 12, to subtract the noise signals from the useful signal picked up by the acoustic antenna.

The isolated transducer 12 shown in FIG. 3, as used for testing the antenna, detecting fixed echoes, and processing noise signals, may be a transducer that is independent from the antenna 10, or else it may be one of the transducers of said antenna, given appropriate cabling.

The tests of the invention are advantageously performed in real time on a regular basis, and the results thereof are stored in memory and compared, thereby usually confirming the stability and the nominal behavior of the antenna and of the associated circuits, and sometimes quantifying the extent to which performance of the equipment (antenna and associated circuits) has become degraded.

We claim:

1. A method of testing an acoustic array directional antenna comprising a plurality of acoustic transducers disposed side by side in a matrix-type configuration and driven by means for generating and processing signals, the method consisting in using at least one acoustic transducer of non-directional type for receiving a given signal simultaneously via said transducer and via the antenna, and in comparing the received signals to identify possible fixed echoes in the signal received by the antenna, and for verifying whether or not the antenna and the associated circuits are in a nominal operating state.

2. A method according to claim 1, consisting in using the antenna to emit a signal train, in using the antenna and the non-directional transducer to receive reflected or backscattered signals corresponding to the emitted signals, and in comparing the signals received by the antenna and by said transducer to identify fixed echoes.

3. A method according to claim 1, consisting in using a plurality of non-directional transducers to receive said signals, and to deduce from the received signals the direction and the range of the obstacles returning the fixed echoes.

4. A method according to claim 1, consisting in picking up ambient noise by means of the antenna and by means of said non-directional transducer, in comparing the picked-up signals, and in deducing therefrom whether or not the antenna and the associated cabling, relay, amplification, and signal generation and processing means are in a nominal operating state.

5. A method according to claim 1, consisting in emitting a signal train firstly over one of the emission paths then over the other, in picking up said signal trains by means of said non-directional transducer, in comparing the picked-up signals, and in deducing therefrom whether or not the emission paths are in a nominal operating state.

6. A method according to claim 1, consisting in picking up ambient noise by means of the non-directional transducer, in processing it by means of the phase and amplitude transfer function between said transducer and the antenna, and in subtracting it from the signal picked up by the antenna to increase the signal/noise ratio of the antenna.

7. A method according to claim 1, wherein the above-mentioned non-directional transducer is one of the transducers of the antenna or is a transducer that is independent from the antenna transducers.

8. A method according to claim 1, wherein the above-mentioned method of testing is performed in real time and on a regular basis, and wherein the results of the tests are stored in memory and compared with one another to reveal the stability and the nominal nature of the antenna and the associated circuits, or possibly to quantify the degradation of the antenna and of the associated circuits.

* * * * *